United States Patent Office 3,428,667
Patented Feb. 18, 1969

3,428,667
N,N-DINITRAMINES OF CERTAIN ORGANIC COMPOUNDS AND PROCESS
Edward E. Hamel, Citrus Heights, and Robert E. Olsen, Shingle Springs, Calif., assignors to Aerojet-General Corporation, Azusa, Calif., a corporation of Ohio
No Drawing. Filed Sept. 20, 1962, Ser. No. 224,979
U.S. Cl. 260—467
Int. Cl. C07c 111/00; C06b 7/00
20 Claims This invention relates to novel N,N-dinitramines and to their method of preparation.

It is an object of this invention to prepare novel N,N-dinitramines. It is another object of this invention to prepare N,N-dinitramines in a novel manner. It is still another object of this invention to prepare compounds which are highly energetic and useful as ingredients in propellant, explosive and pyrotechnic compositions. These and other objects of this invention will be apparent from the detailed description which follows.

The novel N,N-dinitramines of this invention have the following generic formula:

(I) 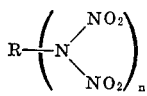

wherein $n$ is a small whole number selected from the group consisting of 1 and 2, and R is a monovalent or divalent organic radical, said monovalent organic radical being selected from the group consisting of alkyl, aryl, haloalkyl, haloaryl, nitroalkyl, nitroaryl, nitraza-interrupted alkyl, nitratoalkyl and nitratoaryl; and said divalent organic radical being selected from the group consisting of alkylene, arylene, halo-substituted alkylene, halo-substituted arylene, nitro-substituted alkylene, nitro-substituted arylene, nitraza-interrupted alkylene, nitrato-substituted alkylene and nitrato-substituted arylene. Preferably, the above-mentioned organic radicals are the lower members of the series containing from 1 to about 10 carbon atoms. The compounds of this invention preferably have a molecular weight greater than 120 and less than about 900.

Illustrative of suitable R groups in the above formula are methyl, decyl, phenyl, trifluoromethyl, chlorophenyl, 3-nitropropyl, nitronaphthyl, 3-nitraza-pentyl, 4-nitratooctyl, nitrato-phenyl, methylene, ethylene, decamethylene, phenylene, 2-chloro-trimethylene, bromophenylene, 2,4-dinitropentamethylene, 2,3-dinitrophenylene, 4-nitraza-heptamethylene, 2-nitrato-trimethylene, and nitratophenylene.

The novel N,N-dinitramines of this invention are prepared by reaction of a non-gaseous highly conductive, ionic nitronium salt with a primary organic nitramine or salt thereof, in accordance with the following general reaction equation:

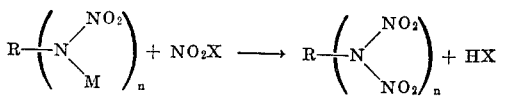

wherein R and $n$ are as defined above and X is the anion portion of the non-gaseous, highly conductive, ionic nitronium salt. The anion, X, is a poor nucleophile, specifically, a poorer nucleophile than the fluoride ion ($F^-$). X may be an anion such as tetrafluoroborate, perchlorate, sulfate, sulfonate, fluorosilicate, hexafluorostannate, hexafluorophosphate, tetrafluorogallate, hexafluoroarsenate, tetrafluoroaurate, and hexafluoroantimonate. In the above equation M is hydrogen, the ammonium group ($NH_4$) or any alkali or alkaline earth metal such as lithium, sodium, potassium, barium or calcium.

In the above reaction, the nitrating agent is preferably selected from the group consisting of nitronium tetrafluoroborate, nitronium perchlorate, nitronium sulfate, nitronium hexafluorostannate, nitronium hexafluorophosphate, nitronium hexafluoroarsenate, nitronium hexafluoroantimonate, nitronium tetrafluoroaurate, nitronium tetrafluorogallate and nitronium sulfonate.

The use of the above-mentioned ionic nitrating agents is essential in the practice of this invention since the use of conventional nitrating agents such as the nitrate esters, nitric acid, and mixtures of nitric acid with sulfuric acid or acetic anhydride do not yield N,N-dinitramines upon treatment of primary nitramines.

In the above reaction, the use of the nitramine salt is preferred over the free nitramine since the use of the salt has been found to give better yields of the desired N,N-dinitramines. For example, when n-butylnitramine was nitrated in accordance with the foregoing reaction, a 50 percent yield of the N,N-dinitro-n-butylamine was obtained. When the ammonium salt of n-butylnitramine was used as the starting material, the yield was 98 percent.

Illustrative of the novel compounds obtainable according to the process of this invention and within the scope of Formula I above, are those compounds having the formula:

(II) 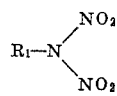

wherein $R_1$ is a monovalent organic radical selected from the class of monovalent organic radicals set forth above. These compounds are obtained from the corresponding primary nitramine which has the formula:

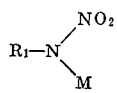

Illustrative compounds within the scope of Formula II and easily prepared according to the method of our invention, include N,N-dinitro-trifluoromethylamine, N,N-dinitrophenylamine, N,N - dinitro-2,4-dinitropentylamine, N,N - dinitro-3-nitratooctylamine, N,N-dinitro-p-chloroaniline, N,N - dinitro-4-nitraza-decylamine, N,N-dinitro-isopropylamine and N,N-dinitroethylamine.

Still another class of compounds obtainable in accordance with the practice of this invention are those having the general formula:

(III) 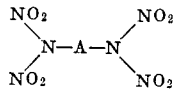

wherein A is a divalent organic radical selected from the class of divalent organic radicals set forth above. The compounds containing divalent organic radicals are obtained by reaction of the nitronium salts with primary dinitramines of the formula:

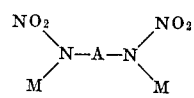

Compounds containing divalent organic groups and being of the type described by Formula III include N,N,N',N'-tetranitromethylenediamine, N,N,N',N'-tetranitroperfluoro-1,3-propylenediamine, N,N,N',N'-tetranitrophenylenediamine, N,N,N',N'-tetranitro-3-nitraza-1,5-pentamethylenediamine, N,N,N',N'-tetranitro-5-nitrato-1,10-decamethylenediamine, N,N,N',N'-tetranitro-3,3-dichloro-1,8-octamethylenediamine, and N,N,N',N'-tetranitro-2,3,5,6-tetrachlorophenylenediamine.

If desired, the reactants may be agitated during the process to improve the reaction rate.

The process of this invention may be carried out over a wide range of temperatures. Preferably best results are obtained when the reaction is carried out at a temperature from about −40° C. to about +30° C.

Preferably, although not necessarily, the process of this invention is carried out by adding the compound to be nitrated to a suitable non-reactive solvent, adjusting the temperature to the desired range and adding the nitrating agent to the mixture with agitation. However, it is to be understood that the use of a solvent is not required in the practice of this invention. Among the great variety of non-reactive solvents which may be employed in the practice of this invention are the aliphatic halo hydrocarbons such as methylene chloride and carbon tetrachloride; and the saturated aliphatic hydrocarbons such as hexane, octane and the like.

After the reaction is complete, the product may be isolated in conventional manner by filtration, extraction, crystallization and/or evaporation.

Proportions of reactants and solvent concentrations are not critical in the practice of this invention. The best results are obtained using from a stoichiometric amount up to a 5–10 mole percent excess of the nitrating agent. The amount of solvent used is such as to give a concentration within the range of 1 weight percent to 20 weight percent of the nitramine reactant, based on the weight of the solvent. Higher concentrations may be used, but since the reaction products are energetic materials, the best operational safety is maintained by the use of these dilute solutions.

The process of this invention may be carried out at any suitable pressure. Normally the reaction is carried out at atmospheric pressure since this is the most convenient method. For best results, the reaction of this invention should be carried out under anhydrous conditions since the nitronium salts are somewhat unstable when in the presence of moisture.

The following examples are presented solely for purposes of illustration and should not be regarded as limitative of the scope of the invention in any way. In the examples the percentages are by weight unless otherwise indicated.

Example I.—Preparation of N,N-dinitro-n-butylamine

A solution of n-butylnitramine (10.0 g.) in 75 ml. of acetonitrile was cooled to −30° C. Nitronium tetrafluoroborate (11.4 g.) was added in small portions with vigorous stirring, keeping the temperature between −20° C. and −30° C. After addition of nitronium tetrafluoroborate, the reaction mixture was allowed to warm to 0° C. and quenched by addition to 400 ml. of ice water. A viscous yellow oil separated. The oil was dissolved in methylene chloride and the resulting solution washed twice with 50 ml. aliquots of cold 4 N sodium hydroxide, three times with 80 ml. portions of distilled water, then dried over anhydrous sodium sulfate.

Methylene chloride was stripped from the solution under water aspirator pressure and the residue distilled twice under reduced pressure. N,N-dinitro-n-butylamine distilled at 27–28° C. (0.02 mm. Hg). The yield was about 50 percent.

Analysis.—Calc'd for $C_4H_9N_3O_4$: C, 29.4; H, 5.52; N, 25.8; mol. wt. 163.

Found: C, 29.6; H, 5.93; N, 25.7.

Example II.—Preparation of N,N-dinitro-n-butylamine

A heterogeneous mixture of the ammonium salt of n-butylnitramine (5.0 g., 0.037 mole) in 30 ml. of acetonitrile was cooled to −30° C. Nitronium tetrafluoroborate (5.0 g., 0.035 mole) was added in small portions with vigorous stirring, keeping the reaction temperature below −20 and −30° C. After the addition of nitronium tetrafluoroborate, the reaction mixture was stirred for 30 minutes at −10 to −20° C. and quenched by addition to 100 ml. of ice-water. A water-white liquid separated. The liquid was dissolved in methylene chloride and dried over anhydrous magnesium sulfate. Methylene chloride was removed under water aspirator pressure and the residue distilled twice under reduced pressure. N,N-dinitro-n-butylamine distilled at 27–28° C. (0.02 mm. Hg). The yield was 5.95 g. (98 percent).

Example III.—Preparation of N,N,N',N'-tetranitroethylenediamine

Ethylenedinitramine (5.0 g.) was treated with 8.8 g. of nitronium tetrafluoroborate in 50 ml. of acetonitrile at −30° C. After allowing the reaction solution to warm to 0° C., the reaction was quenched by addition to 100 ml. of ice water. A yellow, viscous oil (8.6 g.) separated and was dissolved in methylene chloride. The methylene chloride solution was washed twice with 30 ml. aliquots of cold 30 percent sodium hydroxide solution, twice with 50 ml. portions of cold water and dried over anhydrous magnesium sulfate. Methylene chloride was removed from the solution over reduced pressure to yield 3.2 g. (40% yield) of crude N,N,N',N'-tetranitroethylenediamine.

Example IV.—Preparation of N,N-dinitro-1-methylhexylamine

A solution of 1-methylhexylnitramine (6.0 g.) in 50 ml. of acetonitrile was cooled to −30° C. To this solution was added 5.0 g. (0.037 mole) of nitronium tetrafluoroborate. After stirring for 15 minutes, the reaction mixture was quenched by addition to 250 ml. of ice water. The aqueous quench was extracted with 100 ml. of methylene chloride. The methylene chloride solution was washed twice with 50 ml. aliquots of cold, dilute sodium hydroxide solution, dried over anhydrous magnesium sulfate and evaporated in vacuo to leave a yellow liquid. The yellow liquid (5.9 g.) was identified as N,N-dinitro-1-methylhexylamine by infrared analysis.

When the foregoing example is repeated, substituting nitronium hexafluorophosphate in lieu of nitronium tetrafluoroborate, N,N-dinitro-1-methylhexylamine is again obtained in good yield.

Example V.—Preparation of N,N,N',N'-tetranitro-3-nitraza1,5-diaminopentane

A solution of 7.1 g. of N,N'-dinitro-3-nitraza-1,5-diaminopentane in 75 ml. of acetonitrile was cooled to −30° C. To this solution was gradually added, with stirring, 7.95 g. of nitronium tetrafluoroborate. The temperature was maintained at −30° C. to −20° C. throughout the addition, which required approximately 10 minutes. After addition the temperature was raised to 0° C. and maintained there for 15 minutes. The reaction mixture was quenched with 200 ml. of ice water and the resulting mixture extracted with two 100 ml. portions of methylene chloride. The methylene chloride layer was washed with 2.5 percent aqueous sodium hydroxide, then dried over magnesium sulfate. The magnesium sulfate was removed by filtration and the filtrate was evaporated to dryness at reduced pressure. The infrared analysis of this solid showed it to be N,N,N',N'-tetranitro-3-nitraza-1,5-diaminopentane.

Example VI.—Preparation of N,N,N'N'-tetranitro-3-nitraza-1,5-diaminopentane

A heterogeneous mixture of the diammonium salt of 3-nitraza-1,5-dinitraminopentane (10.0 g., 0.037 mole) in 100 ml. of acetonitrile was cooled to −30° C. Nitronium tetrafluoroborate (11.0 g., 0.083 mole) was added in small portions with vigorous stirring. After the addition of nitronium tetrafluoroborate, the reaction mixture was allowed to stir one hour at 0° C. and quenched in 500 ml. of ice water. A viscous, pale yellow oil separated. The oil was dissolved in methylene chloride and washed with two 50 ml. aliquots of cold 0.5 N potassium hydroxide solution, then dried over anhydrous magnesium sulfate. Methylene chloride was removed under water aspirator pressure to leave a yellow semi-solid. Recrystallization of this residue from absolute alcohol gave 5.1 g. of white needles, M.P. 71–72° C. (dec.). The infrared scan of this solid was consistent with that required for N,N,N′N′-tetranitro-3-nitraza-1,5-diaminopentane.

Example VII.—Preparation of N,N′-dinitro-2-nitratoethylamine

To 50 ml. of acetonitrile was added 5.0 g. of 2-nitratoethylnitramine (prepared according to U.S. Patent 2,485,-855). The solution was cooled to −30° C. and 4.4 g. of nitronium tetrafluoroborate was slowly added. The mixture was allowed to warm to 0° C. and stirred for 15 minutes; then quenched in 200 ml. of ice water. The mixture was extracted twice with 75 ml. portions of methylene chloride. The methylene chloride extracts were combined and washed with two 25 ml. aliquots of cold 0.1 M sodium hydroxide, dried over anhydrous magnesium sulfate and solvent removed in vacuo to leave 1.5 g. of N,N-dinitro-2-nitratoethylamine. The N,N-dinitro-2-nitratoethylamine structure was confirmed by infrared analysis.

When the foregoing example is repeated using nitronium perchlorate, nitronium sulfate and nitronium hexafluorostannate in lieu of nitronium tetrafluoroborate, the product N,N-dinitro-2-nitratoethylamine is likewise obtained.

Example VIII.—Preparation of N,N,N′,N′-tetranitro-2-nitrato-1,3-diaminopropane

To 4.5 g. of dinitraminoisopropyl nitrate (prepared according to U.S. Patent 2,485,855) M.P. 164–165° C., 4.5 g., 0.020 mole) was added 5.6 g. of nitronium tetrafluoroborate in 75 ml. of acetonitrile at −30° C. The solution was allowed to warm to 0° C. and stirred for 15 minutes, then quenched in 150 ml. of ice water. The mixture was extracted with two 50 ml. aliquots of methylene chloride. The methylene chloride extracts were combined and washed twice with cold 0.1 M sodium hydroxide, dried over anhydrous magnesium sulfate and the solvent removed in vacuo to leave 0.95 g. of yellow, viscous liquid. Infrared analysis showed the structure to be N,N,N′,N′-tetranitro-2-nitrato-1,3-diaminopropane.

Example IX.—Preparation of N,N-dinitro-3-chloropentylamine

One mole of nitronium tetrafluoroborate is reacted with one mole of 3-chloro-n-pentylnitramine in acetonitrile at about −10° C. After holding the mixture at this temperature for about 0.5 hour, it is quenched with ice water, and the product extracted with methylene chloride. N,N-dinitro-3-chloropentylamine is obtained in good yield.

Example X.—Preparation of N,N,N′,N′-tetranitrophenylenediamine

N,N-dinitrophenylenediamine is reacted with nitronium tetrafluoroborate under the conditions set forth in Example I. N,N,N′,N′-tetranitrophenylenediamine is obtained in good yield. When this example is repeated using the disodium and dipotassium salts of N,N′-dinitrophenylenediamine, similar results are obtained.

The novel N,N-dinitramines of this invention are inherently useful as explosives since they contain an abundance of highly energetic nitro groups, and can be used in any conventional projectile as the main explosive charge. One way of using the high explosives of this invention is to pack the crystalline explosive in powder form into the warhead of the missile. A charge thus prepared can be caused to explode an operation of an impactor time fuse-mechanism firing a detonating explosive such as lead azide or mercury fulminate.

The liquid explosive compositions of this invention are preferably absorbed in cotton, sawdust or similar materials for use as explosives. This technique is the same as is employed in the manufacture of commercial dynamites, gun cotton and the like. The absorbed material presents considerably less hazard in this form and can still be used in the same manner as the solid or crystalline explosives of this invention.

The novel N,N-dinitramines of this invention can also be combined in polymeric binders, such as the polyurethanes, to form propellant compositions. For example, these compounds can be used in place of ammonium perchlorate and other such well-known materials, as the oxidizer in solid propellant formulations.

We claim:
1. Compounds of the formula

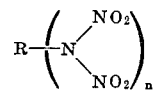

wherein n is a small whole number selected from the group consisting of 1 and 2, and R is selected from the group consisting of monovalent and divalent organic radicals, said monovalent organic radicals being selected from the group consisting of alkyl, aryl, haloalkyl, haloaryl, nitroalkyl, nitroaryl, nitraza-interrupted alkyl, nitratoalkyl and nitratoaryl; and said divalent organic radicals being selected from the group consisting of alkylene, arylene, halo-substituted alkylene, halo-substituted arylene, nitro-substituted alkylene, nitro-substituted arylene, nitraza-interrupted alkylene, nitrato-substituted alkylene and nitrato-substituted arylene.

2. Compounds of the formula

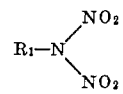

wherein $R_1$ is a monovalent organic radical selected from the group consisting of alkyl, aryl, haloalkyl, haloaryl, nitroalkyl, nitroaryl, nitraza-interrupted alkyl, nitratoalkyl and nitratoaryl.

3. Compounds of the formula

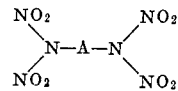

wherein A is a divalent organic radical selected from the group consisting of alkylene, arylene, halo-substituted alkylene, halo-substituted arylene, nitro-substituted alkylene, nitro-substituted arylene, nitraza-interrupted alkylene, nitrato-substituted alkylene and nitrato-substituted arylene.

4. The compound N,N-dinitro-n-butylamine.
5. The compound N,N,N′,N′-tetranitroethylenediamine.
6. The compound N,N-dinitro-1-methylhexylamine.
7. The compound N,N,N′,N′-tetranitro-3-nitraza-1,5-diaminopentane.
8. The compound N,N-dinitro-2-nitratoethylamine.
9. The compound N,N,N′,N′-tetranitro-2-nitrato-1,3-diaminopropane.

10. The method of preparing compounds of the formula

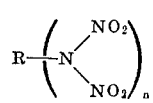

which comprises reacting a non-gaseous highly conductive ionic nitronium salt with a compound of the formula

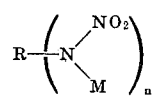

wherein in the above formulae n is a small whole number selected from the group consisting of 1 and 2, R is selected from the group consisting of monovalent and divalent organic radicals, said monovalent organic radicals being selected from the group consisting of alkyl, aryl, haloalkyl, haloaryl, nitroalkyl, nitroaryl, nitraza-interrupted alkyl, nitratoalkyl and nitratoaryl, and said divalent organic radicals being selected from the group consisting of alkylene, arylene, halo-substituted alkylene, halo-substituted arylene, nitro-substituted alkylene, nitro-substituted arylene, nitraza-interrupted alkylene, nitrato-substituted alkylene and nitrato-substituted arylene, and M is selected from the group consisting of hydrogen, the ammonium group, alkali metals and alkaline earth metals.

11. The method of preparing compounds of the formula

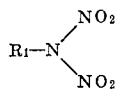

which comprises reacting a non-gaseous highly conductive ionic nitronium salt with a compound of the formula

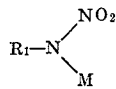

wherein $R_1$ is a monovalent organic radical selected from the group consisting of alkyl, aryl, haloalkyl, haloaryl, nitroalkyl, nitroaryl, nitraza-interrupted alkyl, nitratoalkyl and nitratoaryl; and M is selected from the group consisting of hydrogen, the ammonium group, an alkali metal and an alkaline earth metal.

12. The method of preparing compounds of the formula

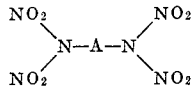

which comprises reacting a non-gaseous highly conductive ionic nitronium salt with a compound of the formula

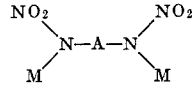

wherein in the above formulae A is a divalent organic radical selected from the group consisting of alkylene, arylene, halo-substituted alkylene, halo-substituted arylene, nitro-substituted alkylene, nitro-substituted arylene, nitraza-interrupted alkylene, nitrato-substituted alkylene and nitrato-substituted arylene; and M is selected from the group consisting of hydrogen, the ammonium group, an alkali metal and an alkaline earth metal.

13. The method of claim 10 wherein the reaction is carried out at a temperature of from about −40° C. to about +30° C.

14. The method of claim 10 wherein the non-gaseous highly conductive ionic nitronium salt is nitronium tetrafluoroborate.

15. The method of preparing N,N-dinitro-n-butylamine, which comprises reacting n-butylnitramine with nitronium tetrafluoroborate.

16. The method of preparing N,N,N′,N′-tetranitroethylenediamine which comprises reacting ethylene dinitramine with nitronium tetrafluoroborate.

17. The method of preparing the compound N,N-dinitro-1-methylhexylamine which comprises reacting 1-methylhexylnitramine with nitronium tetrafluoroborate.

18. The method of preparing the compound N,N,N′,N′-tetranitro-3-nitraza-1,5-diaminopentane which comprises reacting N,N′-dinitro-3-nitraza-1,5-diaminopentane with nitronium tetrafluoroborate.

19. The method of preparing the compound N,N-dinitro-2-nitratoethylamine which comprises reacting 2-nitratoethylnitramine with nitronium tetrafluoroborate.

20. The method of preparing the compound N,N,N′,N′-tetranitro-2-nitrato-1,3-diaminopropane which comprises reacting dinitraminoisopropyl nitrate with nitronium tetrafluoroborate.

References Cited

Urbanski: Chemistry and Technology of Explosives, vol. 3, Pergamon Press, New York, 1967, pp. 16 to 19, 38 to 41 and 74 to 76.

LELAND A. SEBASTIAN, *Primary Examiner.*

U.S. Cl. X.R.

149—19, 92; 260—466, 579, 583